United States Patent [19]

Rahlwes

[11] Patent Number: 4,696,741
[45] Date of Patent: Sep. 29, 1987

[54] VORTEX BREAKER FOR USE IN A LIQUID-LIQUID SEPARATOR OR THE LIKE

[75] Inventor: William C. Rahlwes, West Columbia, Tex.

[73] Assignee: Phillips Petroleum Company, Bartlesville, Okla.

[21] Appl. No.: 853,328

[22] Filed: Apr. 18, 1986

[51] Int. Cl.$^4$ ............................................. B01D 21/24
[52] U.S. Cl. .................................. 210/232; 210/535; 210/540; 210/541
[58] Field of Search ............... 210/533, 534, 519, 540, 210/232, 535, 536, 541, 513, 521, 532.1, 532.2

[56] References Cited

U.S. PATENT DOCUMENTS

| | | |
|---|---|---|
| 823,688 | 6/1906 | Kremer . |
| 1,630,673 | 5/1927 | Schwab et al. . |
| 2,755,933 | 7/1956 | Profit ..................................... 210/51 |
| 3,721,069 | 3/1973 | Walker .................................. 55/319 |
| 3,997,303 | 12/1976 | Newton ................................... 55/97 |
| 4,038,186 | 7/1977 | Potter et al. ......................... 210/540 |
| 4,059,517 | 11/1977 | Strahorn et al. .................... 210/73 R |
| 4,102,787 | 7/1978 | Geurtsen ............................. 210/104 |
| 4,140,178 | 2/1979 | Ohlswager et al. ................ 165/161 |
| 4,372,847 | 2/1983 | Lewis .................................... 210/86 |
| 4,425,239 | 1/1984 | Jacocks et al. ...................... 210/787 |

Primary Examiner—Frank Sever
Attorney, Agent, or Firm—French & Doescher

[57] ABSTRACT

Apparatus for use in a fluid separation vessel to improve the separation of liquids of different densities which includes a tubular conduit extending upwardly a distance from a liquid outlet in the bottom of the vessel, a vertical center plate disposed across the open upper end of the tubular conduit, a pair of mutually parallel vertical side walls on opposite sides of the tubular conduit mounted perpendicular to the center plate, and a horizontal baffle plate mounted on the upper edges of the center plate and the vertical side walls.

12 Claims, 5 Drawing Figures

VORTEX BREAKER FOR USE IN A LIQUID-LIQUID SEPARATOR OR THE LIKE

The present invention is generally directed to apparatus suitable for use in a fluid separation zone to improve the separation of liquids of different densities.

In industry it is often desirable to effectively separate liquids of different densities in fluid separation zones. For example, in the distillation of fluids containing water and hydrocarbons it is often desirable to separate water from the hydrocarbon liquids in the lower portion of a distillation column with the water being drawn off from the lowermost portion of the column while the hydrocarbon liquids may be desirably drawn off from a location located higher in the column for further processing such as passing the hydrocarbon liquids through a reboiler and reintroducing such separated hydrocarbons into the distillation column. When withdrawing such hydrocarbon liquids from the lower portion of a distillation column through a suction outlet, vortices are often generated in the lower portion of the column which adversely affect the desired separation of the water from the hydrocarbons. Accordingly, it is desirable to provide such liquid-liquid separation zones with means for reducing the incidence of a vortices about the hydrocarbon suction outlet in such a distillation column.

To overcome the above-described problems incident to the operation of certain liquid-liquid separation apparatus, the present invention contemplates a vessel having a side wall, a bottom wall, an outlet in the bottom wall, and tubular conduit means having a longitudinal vertical axis and communicating with the outlet and extending a distance vertically upwardly therefrom into the vessel and terminating in a generally horizontal upper end face defining a generally horizontal plane at the upper end thereof. The invention comprises first and second mutually parallel vertical side wall means supported on the bottom wall of the vessel and positioned respectively on opposite sides of the tubular conduit means and having a respective first and second top edges lying in a common generally horizontal plane spaced above the generally horizontal plane defined by the upper end face of the tubular conduit means. The invention further includes generally horizontal top baffle plate means supported on the respective top edges of the first and second vertical side wall means, the top baffle plate means having a generally horizontal bottom surface. The invention is further characterized by vertical center baffle plate means intersecting the vertical longitudinal axis of the tubular conduit means and perpendicular to the first and second vertical side wall means, the center baffle plate means having a top edge, a bottom edge and opposite end edges with the top edge intersecting the bottom surface of the center baffle plate means and with the bottom edge disposed adjacent the upper end face of the tubular conduit means. It is preferred that the opposite end edges of the center baffle plate means be connected respectively to the first and second vertical side wall means. It is further presently preferred that the apparatus include first and second side baffle means disposed respectively on opposite sides of the center baffle plate and substantially mutually parallel thereto, with each of the side baffle means extending downwardly from the bottom surface of the top baffle plate means and being secured at opposite ends thereof to the first and second vertical side wall means; and first and second apertures in the top baffle plate means disposed respectively on opposite sides of the center baffle plate means for providing fluid communication through the top baffle plate means, with each of the apertures being spaced a distance from the center baffle plate means greater than 0.5 times the diameter of the upper end face of the tubular conduit means.

It is an object of the present invention to provide vortex breaker apparatus for use in a liquid-liquid separator or the like which improves the efficiency of separation of liquids of different densities.

Another object of the present invention is to provide liquid-liquid separator apparatus which is economical to construct.

A further object of the present invention is to provide improved liquid-liquid separation through the employment of a simple and effective vortex breaker mechanism which can be simply and easily adapted to existing liquid-liquid separator units.

Yet another object of the present invention is to provide a liquid-liquid separator apparatus which is characterized by increased economy and efficiency.

Other aspects, objects and advantages of the present invention will be readily apparent to those skilled in the art to which the present invention pertains upon further study of the instant specification and claims when read in conjunction with the accompanying drawing in which:

Figure 1:
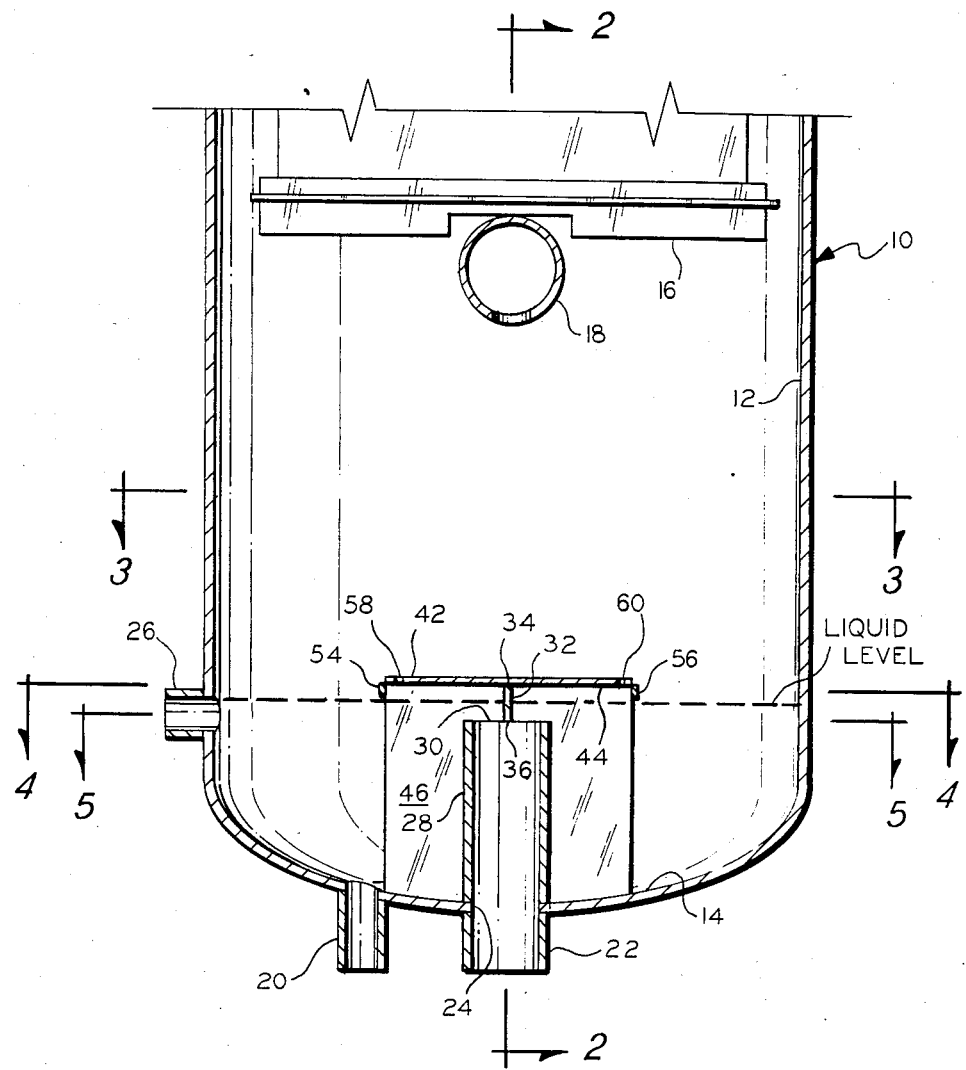
FIG. 1 is a partial vertical cross-sectional view taken along the center line of the lower end portion of liquid-liquid separator vessel illustrating a vortex breaker constructed in accordance with the present invention.
Figure 2:
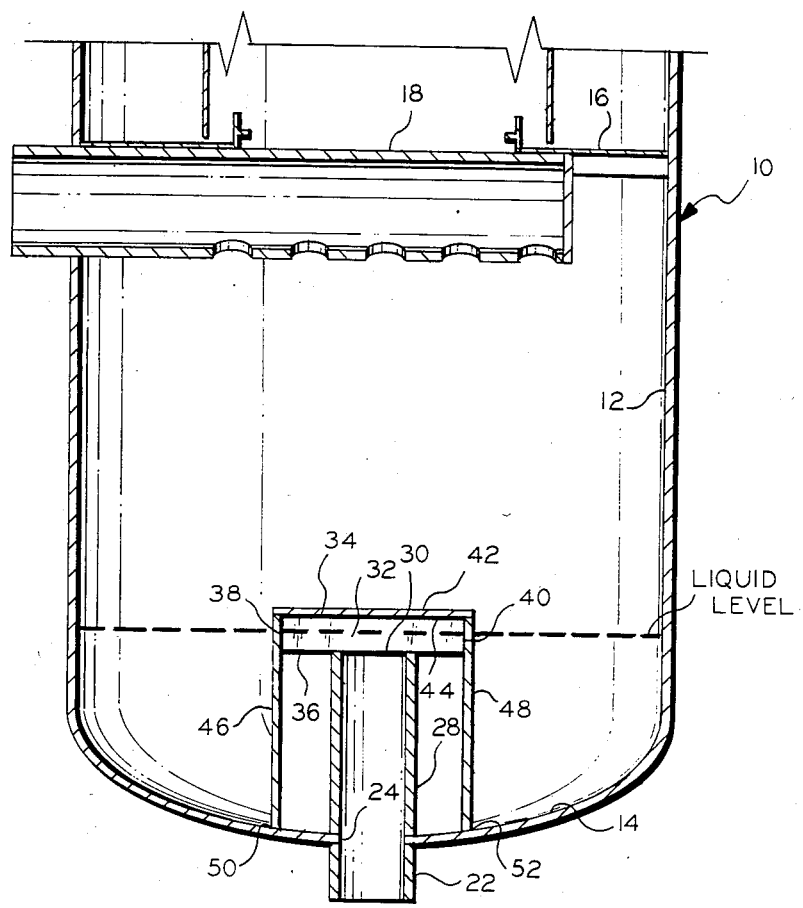
FIG. 2 is a partial vertical cross-sectional view taken along line 2—2 of FIG. 1.

Referring now to the drawings, a vessel constructed in accordance with the present invention is generally designated by the reference character 10. The vessel 10 includes a generally cylindrical side wall 12 and a bottom wall 14. As shown herein, the vessel 10 is in the form of a distillation column. The column includes a seal pan 16 in the lower portion of the vessel 10. Below the seal pan 16 is a return conduit 18 through which hydrocarbon from a reboiler is introduced into the lower portion of the vessel 10. A conduit 20 communicates with the lowermost portion of the vessel 10 via the bottom wall 14 and provides means for drawing separated water off the bottom of the vessel 10 during the operation of the unit. A conduit 22 communicates with the interior of the vessel 10 via a liquid outlet 24 in the center portion of the bottom wall 14. A conduit 26 communicates with the interior of the lower end portion of the vessel 10 via the side wall 12 and provides means for introduction of hydrocarbon fluids from another source. A tubular conduit 28 is mounted in fluid flow communication with the liquid outlet 24 and extends upwardly from the liquid outlet 24 with the longitudinal axis thereof oriented in a vertical direction. The tubular conduit 28 is provided with a generally horizontal terminal end face 30 which is spaced a substantial distance above the bottom wall 14 of the vessel 10. A center baffle plate 32 having an upper edge 34, a lower edge 36 and opposite side edges 38 and 40 lies in a generally vertical plane extending upwardly from the end face 30 of the tubular conduit 28 with the longitudinal axis of the tubular conduit 38 lying in the vertical plane of the center baffle plate 32. A top baffle plate 42 is disposed above the end face 30 of the tubular conduit 28 and lies in a generally horizontal plane. The top baffle plate 42 has a lower face 44 which intersects the upper edge 34 of the center baffle plate 32. The lower edge 36 of the center baffle plate 32 preferably intersects the end face 30 of the tubular conduit 28.

First and second vertical side walls 46 and 48 are disposed respectively on opposite sides of the tubular conduit 28 with the first and second vertical side walls 46 and 48 lying in respective mutually parallel vertical planes each being normal to the horizontal plane of the top baffle plate 42 and normal to the vertical plane of the center baffle plate 32. The first and second vertical side walls 46 and 48 each have an upper edge which intersects the lower face 44 of the top baffle plate 42 and is preferably fixedly secured thereto by suitable means such as welding. The opposite side edges 38 and 40 of the center baffle plate 32 intersect the corresponding vertical side walls 46 and 48 and are also preferably secured thereto by suitable means such as welding. The vertical side walls 46 and 48 also each have a lower edge which intersects the bottom wall 14 and is preferably secured thereto by suitable means such as welding as shown at 50 and 52.

Figure 3:
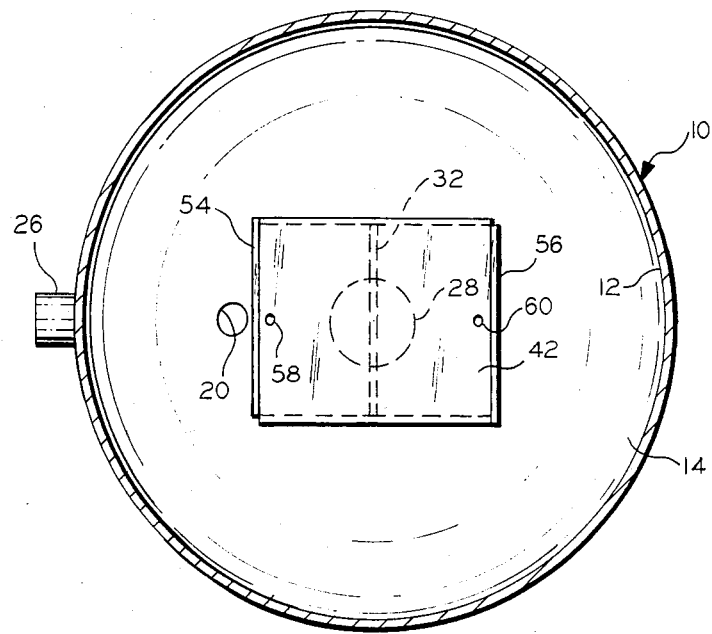
FIG. 3 is a horizontal cross-sectional view taken along line 3—3 of FIG. 1.
Figure 4:
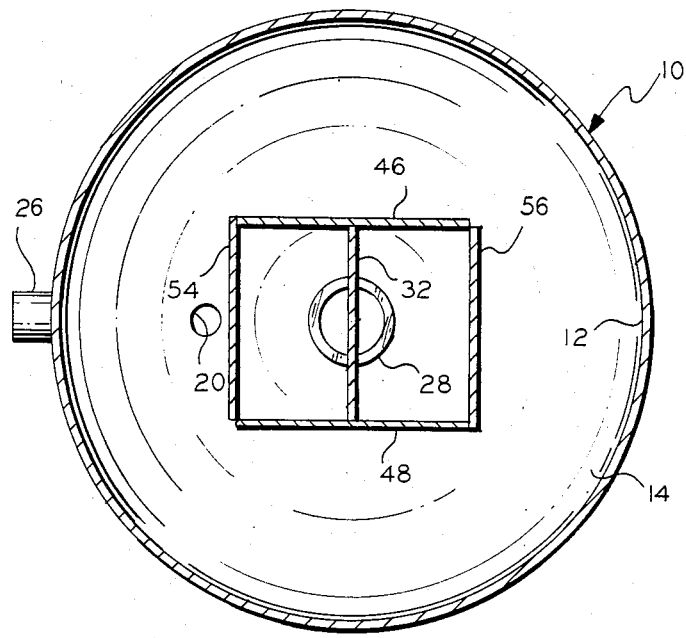
FIG. 4 is a horizontal cross-sectional view taken along line 4—4 of FIG. 1.
Figure 5:
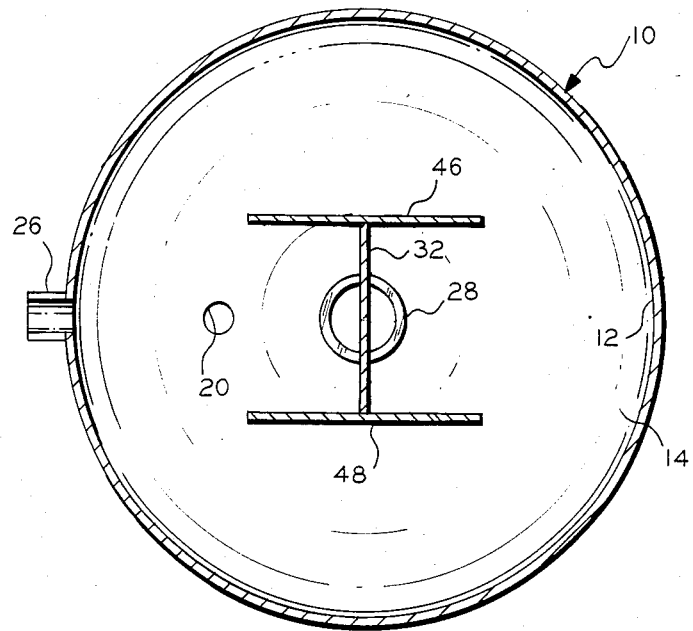
FIG. 5 is a horizontal cross-sectional view taken along line 5—5 of FIG. 1.

It is presently preferred to provide the apparatus of the present invention with first and second vertical side baffles 54 and 56 which lie in corresponding vertical planes on opposite sides of the longitudinal axis of the tubular conduit 28. The upper edge of each vertical side baffle 54 and 56 intersects the lower face 44 of the top baffle plate 42 and is preferably secured thereto by suitable means such as welding. The vertical side baffles 54 and 56 extend downwardly from the top baffle plate 42 with the opposite side edges of each vertical side baffle 54 and 56 intersecting the corresponding vertical side walls 46 and 48 and preferably being fixedly secured thereto by suitable means such as welding. As best shown in FIG. 3, the top baffle plate 42 is provided with a pair of apertures 58 and 60 and disposed respectively on opposite sides of the center baffle plate 32 for providing fluid flow communication through the top baffle plate 42. Each of the apertures 58 and 60 is spaced a distance at least 0.5 times the diameter of the terminal end face 30 of the tubular conduit 28 from the center baffle plate 32. By so spacing the apertures 58 and 60, any liquid falling upon the top baffle plate 42 from above can pass freely through the apertures 58 and 60 without falling into the open upper end of the tubular conduit 28. The apertures 58 and 60 provide venting through the top baffle plate 42 to accommodate variations in liquid level in the lower portion of the vessel 10.

While the top baffle plate 42 can be spaced above the terminal end face 30 of the tubular conduit 28 any distance which provides a suitable flow of liquid into the tubular conduit 28 during the operation of the vessel 10, it is presently preferred that such distance be in the range from about 0.18 to about 0.56 times the diameter of the tubular conduit 28. Similarly, while the tubular conduit 28 can extend upwardly into the vessel any suitable distance which will provide the desired separation of liquids of different densities in the lower portion of the vessel, it is presently preferred that the tubular conduit 28 extend upwardly into the vessel 10 a distance in the range from about 1 to about 5 times the diameter of the tubular conduit 28. It will also be noted that the first and second vertical side walls 46 and 48 can be horizontally spaced from one another any distance which provides suitable liquid flow to the tubular conduit 28 during the operation of the vessel 10, however, it is presently preferred that the horizontal spacing between the vertical side walls 46 and 48 be in the range from about 1 to about 3.5 times the diameter of the tubular conduit 28.

In the operation of the vessel 10, liquids comprising hydrocarbons and water accumulate in the lower end portion of the vessel 10. As the level of liquids in the vessel 10 rises above the horizontal plane of the terminal end face 30 of the tubular conduit 28, hydrocarbons which have separated from water by virtue of the difference in their densities can be drawn off through the tubular conduit 28 and circulated through a suitable reboiler for reintroduction into the vessel 10 via the return conduit 18. Water which is separated out to the lowermost portion of the vessel can periodically or continuously be removed from the lower portion of the vessel via conduit 20. The vortex breaker structure comprising the center baffle plate 32, the top baffle plate 42, the vertical side walls 46 and 48 and the vertical side baffles 54 and 56 effectively prevents or reduces remixing of the separated water and hydrocarbons during the drawing off of the hydrocarbons through the tubular conduit 28 by effectively increasing the path along which the liquids in the lower portion of the vessel 10 must follow before reaching the inlet of the tubular conduit 28. The vertically oriented center baffle plate 32 and side walls 46 and 48 effectively prevent the generation of vortices within the body of liquid in the lower portion of the vessel 10 during the withdrawal of hydrocarbons through the tubular conduit 28.

From the foregoing, it will be seen that the apparatus of the present invention readily meets the recited objectives set forth above. Changes may be made in the combination and arrangement of parts or elements as heretofore set forth in the specification and shown in the drawings without departing from the spirit and scope of the invention as defined in the following claims.

I claim:
1. In a vessel of the type in which two fluid phases are separated, said vessel having a side wall and a bottom wall, first liquid outlet means in the bottom wall, and fluid inlet means communicating with said vessel above said first liquid outlet means, the improvement comprising: means for breaking vortices including,
   tubular conduit means in fluid flow communication with said first liquid outlet means and extending a distance vertically into said vessel, said tubular conduit means having a vertical longitudinal axis and an upper terminal end face opening into said vessel, said terminal end face lying ibn a generally horizontal plane;
   center baffle plate means having an upper edge, a lower edge and opposite side edges and lying in a first vertical plane and extending upwardly from the upper terminal end face of said tubular conduit means with the vertical longitudinal axis of said tubular conduit means lying in said first vertical plane of said center baffle plate means;
   top baffle plate means disposed above the upper terminal end face of said tubular conduit means and lying in a generally horizontal plane, said top baffle plate means having a lower face intersecting the upper edge of said center baffle plate means, said top baffle plate means being spaced a distance above the upper terminal end face of said tubular conduit means by said center baffle plate means; and first and second vertical side wall means disposed respectively on opposite sides of said tubular conduit means, said first and second vertical side wall means lying in respective mutually parallel vertical planes each being normal to the generally horizontal plane of said top baffle plate means and normal to the first vertical plane of said center baffle plate means, said first and second vertical side wall means each having an upper edge intersecting the lower face of said top baffle plate means with the opposite side edges of said center baffle plate means intersecting said first and second vertical side wall means, and said first and second vertical side wall means each having a lower edge intersecting the bottom wall of said vessel.

2. Apparatus in accordance with claim 1 wherein said top baffle plate means is spaced above the upper terminal end face of said tubular conduit means a distance in the range from about 0.18 to about 0.56 times the diameter of said tubular conduit means.

3. Apparatus in accordance with claim 1 wherein said tubular conduit means extends vertically upwardly into said vessel a distance in the range from about 1 to about 5 times the diameter of said tubular conduit means.

4. Apparatus in accordance with claim 1 wherein said first and second vertical side wall means are horizontally spaced from one another a distance in the range from about 1 to about 3.5 times the diameter of said tubular conduit means.

5. Apparatus in accordance with claim 1 further comprising:

first and second vertical side baffle means disposed respectively on opposite sides of the longitudinal axis of said tubular conduit means, said first and second vertical side baffle means lying in respective vertical planes mutually parallel to the first vertical plane of said center baffle means, with each of said first and second vertical side baffle means extending downwardly from the lower face of said top baffle plate means and intersecting the first and second vertical side wall means; and first and second apertures in said top baffle plate means disposed respectively on opposite sides of said center baffle plate means for providing fluid flow communication through said top baffle plate means, each said aperture being spaced a distance of at least 0.5 times the diameter of the upper terminal end face of said tubular conduit means from said center baffle plate means.

6. In a vessel having a side wall, a bottom wall, an outlet in the bottom wall, and tubular conduit means having a longitudinal vertical axis communicating with said outlet and extending a distance vertically upwardly therefrom into said vessel and terminating in a generally horizontal upper end face defining a generally horizontal plane at the upper end thereof, the improvement comprising means for breaking vortices including, first and second mutually parallel vertical side wall means supported on said bottom wall and positioned respectively on opposite sides of said tubular conduit means and having respective first and second top edges lying in a common horizontal plane spaced above the generally horizontal plane defined by the upper end face of said tubular conduit means;

generally horizontal top baffle plate means supported on the respective top edges of said first and second vertical side wall means, said top baffle plate means having a horizontal bottom surface; and vertical center baffle plate means intersecting the vertical longitudinal axis of said tubular conduit means and perpendicular to said first and second vertical side wall means, said center baffle plate means having a top edge, a bottom edge and opposite side edges with the top edge intersecting the bottom surface of said center baffle plate means and with the bottom edge disposed adjacent the upper end face of said tubular conduit means.

7. Apparatus in accordance with claim 6 wherein the opposite end edges of said center baffle plate means are connected respectively to said first and second vertical side wall means.

8. Apparatus in accordance with claim 7 further comprising:

first and second side baffle means disposed respectively on opposite sides of said center baffle plate means and substantially mutually parallel thereto, each of said side baffle means extending downwardly from the horizontal bottom surface of said top baffle plate means and being secured at opposite ends thereof to said first and second vertical side wall means; and first and second apertures in said top baffle plate means disposed respectively on opposite sides of said center baffle plate means for providing fluid communication through said top baffle plate means, each of said apertures being spaced a distance from said center baffle plate means greater than 0.5 times the diameter of said upper end face of said tubular conduit means.

9. Apparatus in accordance with claim 6 wherein said top baffle plate means is spaced above the upper end face of said tubular conduit means a distance in the range from about 0.18 to about 0.56 times the diameter of said tubular conduit means.

10. Apparatus in accordance with claim 6 wherein said tubular conduit means extends vertically upwardly into said vessel a distance in the range of from about 1 to about 5 times the diameter of said tubular conduit means.

11. Apparatus in accordance with claim 6 wherein said first and second vertical side wall means are horizontally spaced from one another a distance in the range from about 1 to about 3.5 times the diameter of said tubular conduit means.

12. Apparatus in accordance with claim 6 further comprising:

liquid outlet means in the bottom wall of said vessel for allowing the flow of liquid therethrough.

* * * * *